United States Patent

[11] 3,579,870

[72] Inventors George K. Bennett
Bronxville;
Richard G. Buchanan, New York, N.Y.
[21] Appl. No. 853,315
[22] Filed Aug. 27, 1969
[45] Patented May 25, 1971
[73] Assignee The Psychological Corporation
New York, N.Y.

[54] TEST ADMINISTERING APPARATUS
10 Claims, 4 Drawing Figs.
[52] U.S. Cl................................................... 35/48R,
179/100.2S
[51] Int. Cl.................................................... G09b 7/00
[50] Field of Search........................................ 35/8 (A), 9,
13, 35 (C), 48; 179/100.2 (S)

[56] References Cited
UNITED STATES PATENTS
| | | | |
|---|---|---|---|
| 3,217,428 | 11/1965 | Spaulding..................... | 35/35(C) |
| 3,222,597 | 12/1965 | Beatenbough et al........ | 35/8AX |
| 3,269,033 | 8/1966 | Redfield et al................ | 35/35(C) |
| 3,294,924 | 12/1966 | Fein.............................. | 35/35(C) |
| 3,405,461 | 10/1968 | Joslow.......................... | 35/35(C) |
| 3,484,955 | 12/1969 | Lippert......................... | 35/35(C) |

FOREIGN PATENTS
| | | | |
|---|---|---|---|
| 1,062,015 | 3/1967 | Great Britain................ | 35/35(C) |

Primary Examiner—William H. Grieb
Attorneys—Lewis H. Eslinger, Alvin Sinderbrand and Curtis, Morris and Safford

ABSTRACT: A test administering apparatus has a plurality of tape playback units individually controllable by an examiner at a console to provide verbal instructions for, and to time a respective test, and the outputs of the playback units are selectively fed, as by station selector switches at the console, to any of a plurality of headphones or earpieces to be utilized by individual examinees and/or to selected loudspeakers in examination rooms occupied by groups of examinees. An alert signal is provided from each operating playback unit to the examiner near the end of the allotted time for the respective test and the end of such allotted time is also signalled to the examiner as well as to each examinee taking the test.

INVENTORS
GEORGE K. BENNETT
RICHARD G. BUCHANAN

ATTORNEY

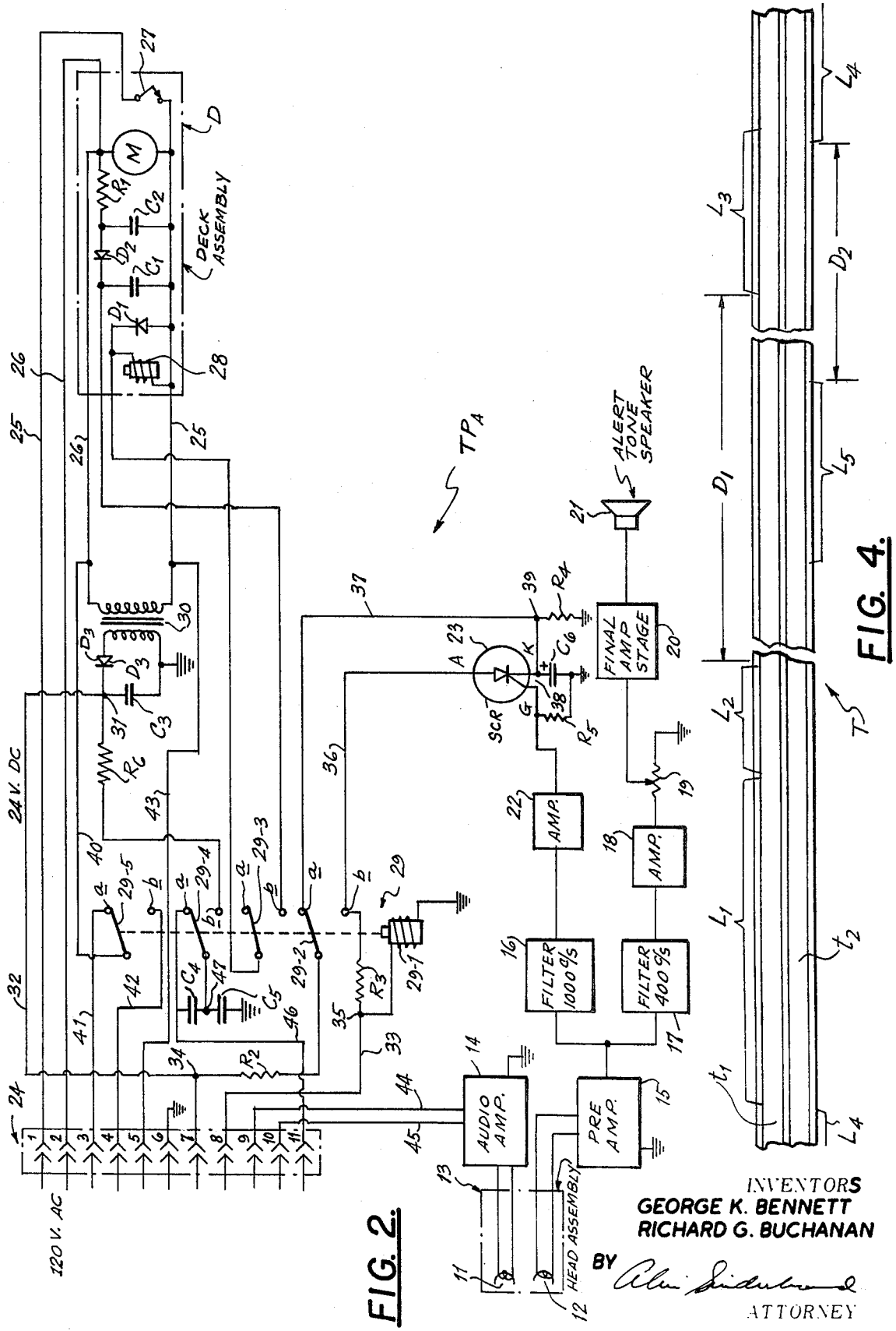

TEST ADMINISTERING APPARATUS

This invention relates generally to test administering apparatus, that is, to apparatus for use in administering standardized aptitude, psychological, achievement or employment tests.

Heretofore, in administering tests of the described type, the examiner first distributed the printed test materials to each examinee and then orally presented the directions or instructions for the respective test. After such preparation, the examiner signalled the start of the test and, by means of a clock or other timing device, kept track of the time allotted for the test and signalled the end of the allotted time.

The foregoing conventional procedure for administering tests has many disadvantages. The necessity of orally presenting the test instructions to successive examinees or groups thereof is a tedious chore for the examiner, and the instructions may not be audibly or clearly presented or uniformly given to all examinees. The time allotted for each test may not be exactly observed, that is, an error or oversight by the examiner may result in different times being given for the completion of a test by several examinees so that the test results are not a fair measure of their relative abilities or capacities. Since the examiner is charged with orally presenting the test instructions and with personally timing the tests, it is difficult for a single examiner to simultaneously administer several different tests having different instructions and differently allotted times, or to administer a test to several examinees who do not start the test at the same time. Further, the above-described functions of the examiner in the conventional administration of standardized tests so completely occupy the attention of the examiner as to preclude the simultaneous performance of any other functions, such as, the scoring of previously given tests, the interviewing of applicants and handling of employment applications and references and the like.

Another object is to provide a test administering apparatus by which the examiner can with convenience simultaneously administer several different tests to different examinees or groups thereof or administer a test to examinees who start the test at different times.

A further specific object is to ensure that, in the administering of tests of the described character, there is precise uniformity in the giving of the instructions to various examinees and also in the timing of the tests so that the test results can be relied upon.

Still another object is to provide a test administering apparatus which minimizes the training required of the examiner, particularly when various tests are to be given.

In accordance with this invention, a test administering apparatus has a plurality of tape playback units each adapted to receive a tape cartridge on the tape of which there are recorded at least the verbal instructions for a respective test, verbal or other audible start and stop signals which are suitably spaced apart along the tape so that, at the standard running speed of the tape during operation of the playback unit, the time interval between reproduction of the start signal and of the stop signal corresponds to the time allotted for the respective test and an inaudible cue signal located on the tape to be reproduced at, or about the same time as the audible stop signal, and the operation of each playback unit is selectively initiated by the examiner, preferably from a single console, and halted automatically upon the reproduction of the one signal. Further, the reproduced verbal instructions for a particular test and the verbal or other audible start and stop signals are selectively fed, as by selector switches at the console, from each of the operated playback units to any of a plurality of headphones or earpieces to be utilized by examinees at individual testing stations and/or to selected loudspeakers in examination rooms occupied by groups of examinees.

In a preferred embodiment of the invention, the tape of each cartridge further bears an alert signal positioned thereon to be reproduced a short time, for example, five seconds, before the reproduction of the cue signal which stops the respective playback unit, and such alert signal is reproduced at the console, in an audible or other readily observable form, to alert the examiner to the impending conclusion of a testing period. An audible signal is also provided at the console in response to the reproduction of the cue signal so as to advise the examiner of the actual completion of a testing period.

The above, and other objects, features and advantages of this invention, will be apparent in the following detailed description of an illustrative embodiment thereof which is to be read in connection with the accompanying drawings, wherein:

FIG. 2 is a schematic and wiring diagram for one of the tape playback units included in the apparatus of FIG. 1;

FIG. 4 is a fragmentary diagrammatic view of a two-track tape to be used with the apparatus according to this invention and indicating the various signals to be recorded thereon.

Figure 1:
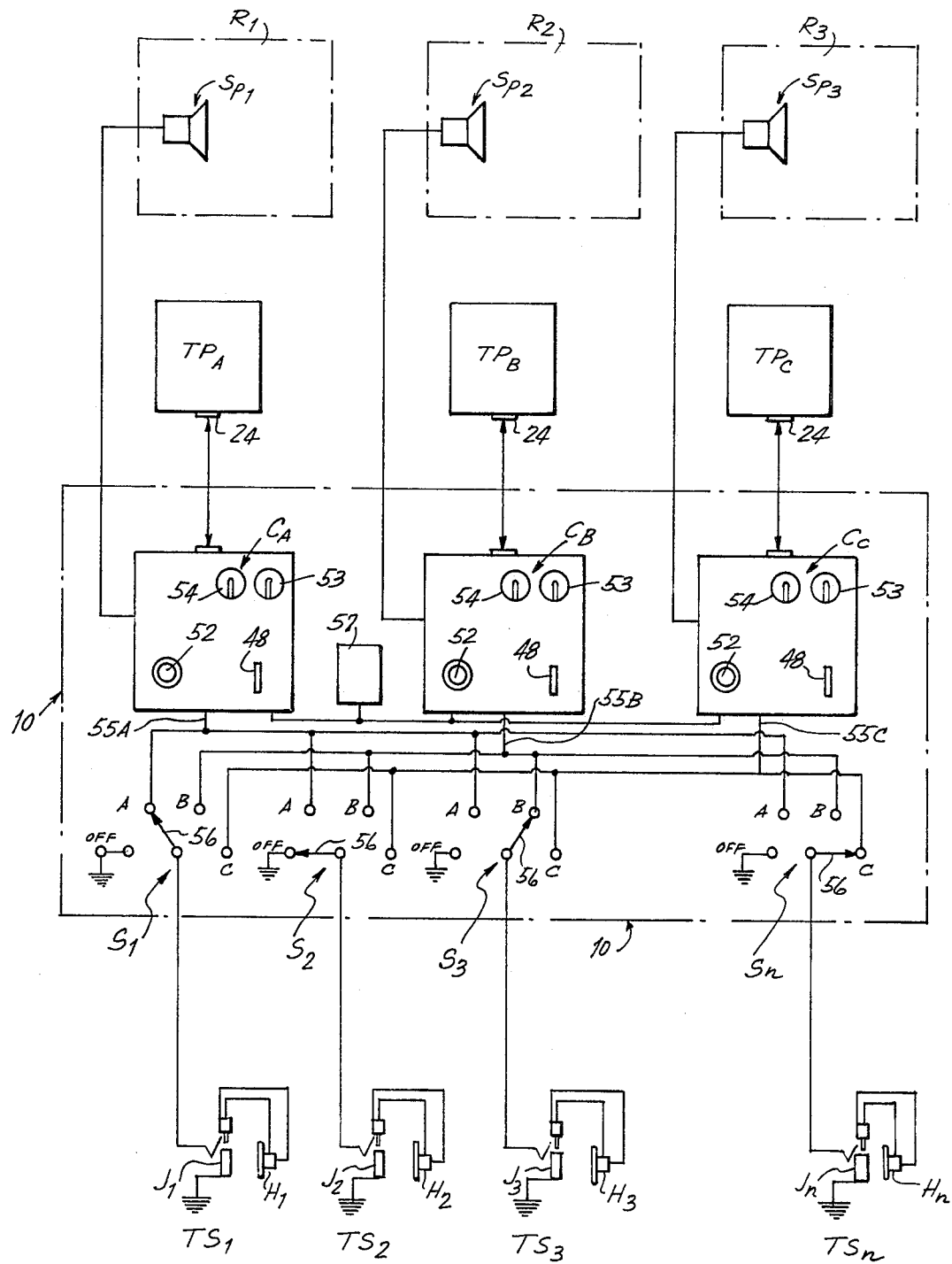
FIG. 1 is a schematic diagram showing a test administering apparatus according to this invention.

Referring to the drawings in detail, and initially to FIG. 1 thereof, it will be seen that a test administering apparatus according to this invention generally comprises plural, for example, three, tape playback units $TP_A$, $TP_B$ and $TP_C$ located adjacent a console 10, testing stations $TS_1$, $TS_2$, $TS_3$—$TS_n$, for example, 10 in number, that may be remote from console 10 and at which headphones $H_1$, $H_2$, $H_3$—$H_n$ are located for providing instructions and verbal start and stop signals to individual examinees, and examination rooms $R_1$, $R_2$ and $R_3$ also remote from console 10 and in which loudspeakers $Sp_1$, $Sp_2$ and $Sp_3$ are respectively located for audibly reproducing verbal instructions and start and stop signals for groups of examinees occupying such rooms.

The console 10 is shown to generally include control units $C_A$, $C_B$ and $C_C$ by which an examiner at the console can control and be made aware of the operating conditions of tape playback units $TP_A$, $TP_B$ and $TP_C$, respectively, and station selector switches $S_1$, $S_2$, $S_3$—$S_n$ connected with jacks $J_1$, $J_2$, $J_3$—$J_n$ at the testing stations $TS_1$, $TS_2$, $TS_3$—$TS_n$, respectively, for receiving the headphones and also connected with control units $C_A$, $C_B$ and $C_C$ for selectively determining which of the audio outputs of the tape playback units is fed to each of the testing stations.

Each of the tape play-back units $TP_A$, $TP_B$ and $TP_C$ generally includes a tape cartridge handler, or deck D, for example, of the type that is commercially available under the designation Viking Model "36" from Viking of Minneapolis, Inc., 9600 Aldrich Avenue South, Minneapolis, Minn., and which is operable to reproduce magnetically recorded signals provided on an endless loop of tape in a cartridge, for example, of the type available commercially under the trade name Fidelipac from Telepro Industries, Inc., Cherry Hill, New Jersey. As shown on FIG. 4, the endless loop of tape T to be used according to this invention has two record tracks $t_1$ and $t_2$ which are to be respectively scanned by magnetic playback heads 11 and 12 included in a head assembly 13 of each playback unit (FIG. 2).

The track $t_1$ of the tape loop has recorded, along a length $L_1$ thereof, verbal instructions or directions for the performance of a respective test followed, as at $L_2$, by a verbal or other audible start signal (FIG. 4). Further, a verbal or other audible stop signal is recorded in a length $L_3$ of track $t_1$ which is spaced from the length $L_2$ containing the start signal by a distance $D_1$ selected so that, at the standard running speed of the tape T during operation of the playback unit, the time interval between reproduction of the start signal and reproduction of the stop signal will correspond to the time allotted for the respective test. Although for purposes of illustration FIG. 4 shows the ends of tape T spaced from each other, it will be apparent that such ends are, in practice, joined to form a loop with the length $L_1$ of track $t_1$ returning to the position of head 11 after the latter has reproduced the stop signal in length $L_3$.

The tape T to be used in the apparatus according to this invention also has recorded, in a length $L_4$ of its tract $t_2$, a cue tone or signal, for example, of 1000 c./s., and such length $L_4$ is located along the tape so that the cue signal recorded therein is reproduced by head 12 simultaneously with, or shortly after the reproduction by head 11 of the verbal stop signal in length $L_3$. Further, there is recorded in track $t_2$ of the tape an alert tone signal, for example, of 400 c./s., in a length $L_5$ which precedes length $L_4$ by a distance $D_2$ selected so that, at the standard running speed of the tape T, the alert tone signal in length $L_5$ is reproduced a suitable time, for example, 5 to 10 seconds, before the reproduction of the cue signal in length $L_4$.

The tape playback units $TP_A$, $TP_B$ and $TP_C$ are identical and, as shown on FIG. 2 with reference to unit $TP_A$, each include, in addition to the previously mentioned deck assembly D and head assembly 13, an audio amplifier 14 for amplifying the verbal signals reproduced by head 11, and a preamplifier 15 for the alert tone and cue signals reproduced by head 12. The output of preamplifier 15 is applied to filters 16 and 17 which are designed to pass the 1000 c./s. cue signal and the 400 c./s. alert tone signal, respectively. The filters 16 and 17 are preferably of the notch-type so as to clip and limit the respective 1000 c./s. and 400 c./s. signals. The 400 c./s. signal passing filter 17 is further amplified, as at 18, and has its volume controlled by a variable resistor 19 prior to passing through a final amplification stage 20 to a loudspeaker 21 by which the alert tone signal of 400 c./s. is audibly reproduced.

The 1000 c./s. cue signal passing filter 16 is amplified by an amplifier 22 having its output connected with the gate G of a semiconductor controlled rectifier (SCR) 23 which is fired, that is, rendered conducting from its anode A to its cathode K, only when gate G receives an amplified 1000 c./s. pulse. As hereinafter described in detail, such firing of SCR 23 in response to reproduction of the 1000 c./s. cue signal recorded on the tape is employed to halt the operation of the tape playback unit $TP_A$.

A connector 24 is provided for connecting each tape playback unit to the respective control unit $C_A$, $C_B$ or $C_C$ of console 10, and such connector has 11 connector pins 24-1 to 24-11. As shown on FIG. 2, connector pins 24-1 and 24-2 receive 120 v. AC and have conductors 25, 26 extending therefrom to the motor M of deck assembly D for driving the usual capstan of the latter. A switch 27 is interposed in conductor 25 and is operable by a play-release lever (not shown) which opens switch 27 when the usual capstan pressure roller (not shown) is retracted to permit the installation or removal of a tape cartridge. Thus, motor M can be operated only when the play-release lever is manipulated to lock the cartridge on the deck and to close switch 27 while extending the capstan pressure roller to a position near to the capstan. The transport or drive of the tape by the capstan driven by motor M occurs only when a solenoid 28 is energized to cause the capstan pressure roller to bear against the driven capstan with the tape therebetween.

A relay 29 is provided to control the operations of tape playback unit $TP_A$ and includes a coil 29-1 and four movable contacts 29-2, 29-3, 29-4 and 29-5 which engage fixed contacts $a$ when coil 29-1 is deenergized, as shown, and fixed contacts $b$ upon energizing of coil 29-1. A circuit for energizing solenoid 28 extends between conductors 25 and 26 and includes movable relay contact 29-3 and its fixed contact $b$ and a DC power supply constituted by diodes $D_1$ and $D_2$, capacitors $C_1$ and $C_2$ and a resistor $R_1$ in the configuration as shown. Thus, solenoid 28 is energized to cause the tape to be driven only when relay coil 29-1 is energized to engage contact 29-3 with its fixed contact $b$.

Conductors 25 and 26 apply 120 v. AC to the primary winding of a transformer 30, and the secondary winding of transformer 30 has a diode $D_3$ and capacitor $C_3$ connected thereacross, as shown, to provide 24 v. DC at a junction 31 therebetween. A conductor 32 extends from junction 31 to apply 24 v. DC to connector pin 24-7 and, for initiating energizing of relay coil 29-1, a circuit is closed between connector pin 24-7 and connector pin 24-8, as hereinafter described in detail. A conductor 33 extends from pin 24-8 to one side of coil 29-1 which has its other side grounded, as shown. Thus, closing of the circuit between pins 24-7 and 24-8 applies 24 v. DC to coil 29-1 for energizing the latter and hence moving contacts 29-2, 29-3, 29-4 and 29-5 into engagement with their respective fixed contact $b$. Upon engagement of contact 29-2 with its contact $b$, a circuit is closed from a junction 34 with conductor 32 through a resistor $R_2$, contact 29-2 engaged with its contact $b$ and a resistor $R_3$ to a junction 35 with conductor 33, whereby to hold relay 29 in its energized condition.

Also extending from the fixed contact $b$ associated with movable relay contact 29-2 is a conductor 36 connected to the anode A of SCR 23. A capacitor $C_6$ is connected between cathode K of SCR 23 and ground, and a conductor 37 extends from the fixed contact $a$ associated with movable relay contact 29-2 to a junction 38 between cathode K and capacitor $C_6$. A resistor $R_4$ extends between a junction 39 with conductor 37 and ground, and a resistor $R_5$ is connected between the output of amplifier 22 and ground to limit the amplitude of the pulse that can be applied to the gate G of SCR 23.

It will be seen that, when switch 27 of deck D is closed to energize transformer 30 and thus provide 24 v. DC to conductor 32 and through resistor $R_2$ to relay contact 29-2, prior to energizing of relay coil 29-1 the DC voltage is applied through conductor 37 to place a charge on capacitor $C_6$. Thus, if, upon energizing of relay 29 to commence the operation of tape playback unique $TP_A$, head 12 picks up the 1000 c./s. cue signal in the terminal portion of length $L_4$ of tract $t_2$ and thereby causes momentary firing of SCR 23, the charge on capacitor $C_6$ prevents the occurrence of such a voltage drop at the connection to resistor $R_3$ as would result in pulling down of the voltage below the release level of relay 29 with consequent opening of the latter. After length $L_4$ of track $t_2$ has been moved away from head 12 in response to energizing or closing of relay 29, the previously applied charge on capacitor $C_6$ is bled off or discharged through resistor $R_4$ with a time constant determined by the latter so that, when head 12 thereafter reproduces the 1000 c./s. cue signal from length $L_4$ of tract $t_2$, the resultant firing of SCR 23 for a predetermined period, for example for one-twentieth second, causes the voltage to be pulled down below the release level of the relay through the conductive path established through the SCR to the discharged capacitor $C_6$. Thus, relay 29 is deenergized or opened to halt operation of tape playback unit $TP_A$ at the end of the time allotted for a respective test.

If prior to the reproduction of the 1000 c./s. cue signal by head 12 from tape length $L_4$ there are momentary spurious 1000 c./s. signals passed to gate G of SCR 23, such spurious signals are incapable of firing the SCR which is selected to be fired only by a pulse of sufficient duration, for example, of about one-twentieth second duration.

It will further be seen on FIG. 2 that a conductor 40 extends from conductor 26 to movable relay contact 29-5 and that conductors 41 and 42 extend from the associated fixed contacts $a$ and $b$, respectively, to connector pins 24-3 and 24-4 for connection to respective indicator lights, as hereinafter described. A conductor 43 also extends from conductor 25 to connector pin 24-5 which forms a common connection for the lights. The connector pin 24-6 is connected to ground, as shown, while connector pins 24-9 and 24-10 are connected by conductors 44 and 45 to the output terminals of audio amplifier 14. Finally, with respect to FIG. 2, it will be seen that connector pin 24-11 is connected through a conductor 46 with fixed contact $a$ associated with movable relay contact 29-4 which is connected to a junction 47 between capacitors $C_4$ and $C_5$ connected between conductor 46 and ground. The fixed contact $b$ associated with relay contact 29-4 is shown to be connected through a resistor $R_6$ with the junction 31 at which DC voltage is available.

Figure 3:
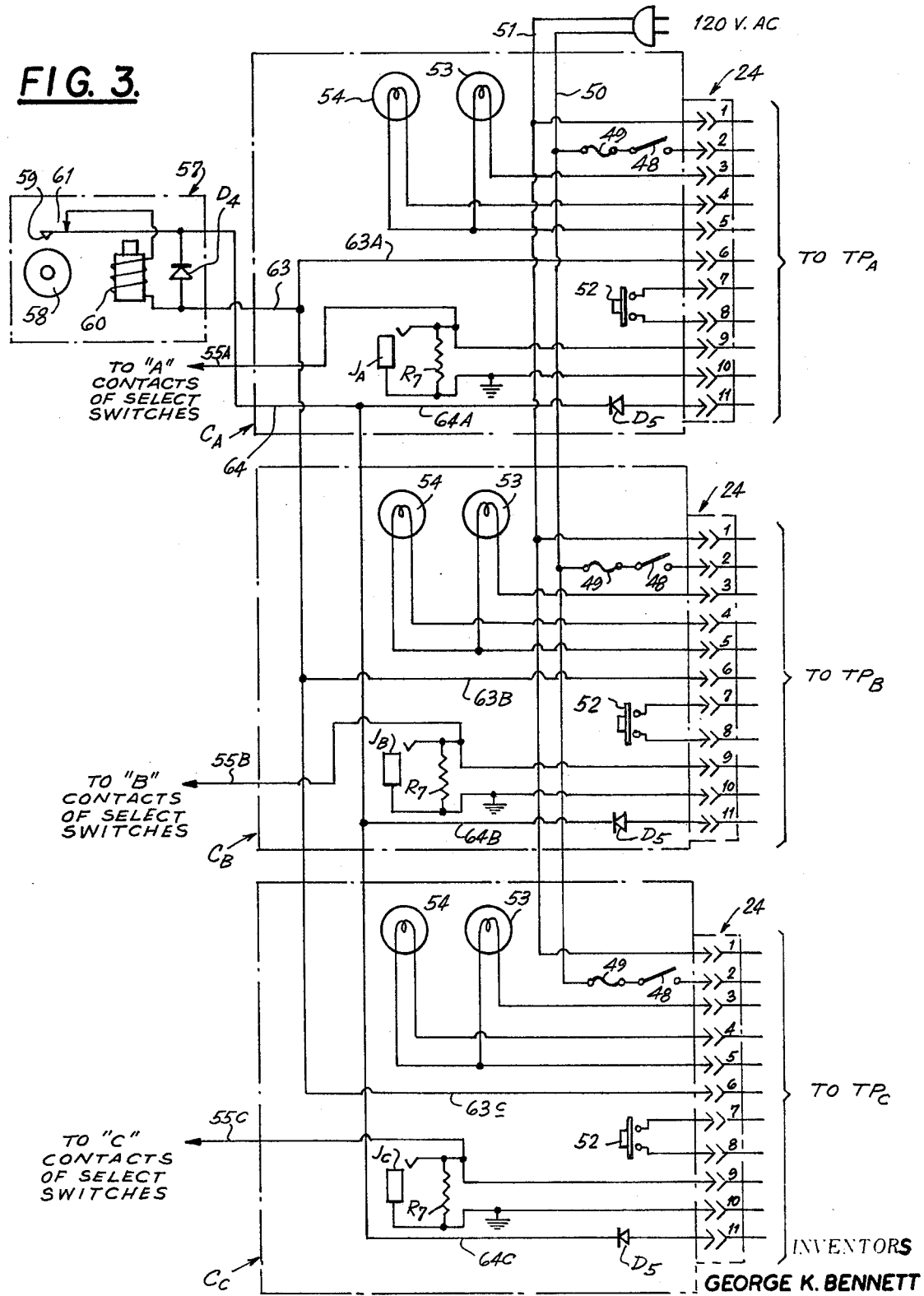
FIG. 3 is a wiring diagram for the console provided in the apparatus of FIG. 1 for controlling the various tape playback units.

Referring now to FIG. 3, it will be seen that each of control units $C_A$, $C_B$ and $C_C$ connected with its respective tape playback unit $TP_A$, $TP_B$ or $TP_C$ by a connector 24 includes an on-off switch 48 interposed in series with a fuse 49 between connector pin 24–2 and one 120 v. AC power supply line 50, while the other power supply line 51 is connected to connector pin 24–1 in each connector 24. Further, each control unit includes a pushbutton start switch 52 connected between connector pins 24–7 and 24–8, and lights 53 and 54 both connected, at one side, to connector pin 24–5 and respectively connected at their other sides to connector pins 24–3 and 24–4. In each control unit of console 10 there is also a jack $J_A$, $J_B$ and $J_C$ connected with the respective connector pins 24–9 and 24–10, one of which is grounded as shown, with a resistor $R_7$ across the leads to such connector pins. The jacks $J_A$, $J_B$ and $J_C$ are adapted to selectively receive plugs (not shown) for connecting the same with loudspeakers $Sp_1$, $Sp_2$ and $Sp_3$. Further, extending from control units $C_A$, $C_B$ and $C_C$ are conductors 55A, 55B and 55C which connect with the connector pins 24–9 of the associated connectors.

As shown on FIG. 1, each of station selector switches $S_1$, $S_2$, $S_3$—$S_n$ includes a wiper or movable contact 56 adapted to be selectively engaged with either an "off" contact which is grounded, or with one of the other fixed contacts indicated at A, B and C. The wiper contact 56 of each station selecting switch is connected to the jack $J_1$, $J_2$, $J_3$ or $J_n$ at the respective station, and the conductors 55A, 55B and 55C are connected, as shown, to the contacts A, B and C, respectively, of all of the selector switches. Thus, the selector switches $S_1$, $S_2$, $S_3$—$S_n$ can be arranged so that the head phones at the respective testing stations will receive the audio output from any one of control units $C_A$, $C_B$ or $C_C$ or will be inoperative.

Referring again to FIG. 3, it will be seen that the console 10 further includes a bell assembly 57 having a bell 58 and a striker 59 which is normally spaced from the bell and displaced to strike the latter upon an energization of a solenoid 60. In series with solenoid 60 are normally closed contacts 61 which open in response to movement of striker 59 by solenoid 60, and a diode $D_4$ is connected in parallel with solenoid 60 and contacts 61 between conductors 63 and 64 which have parallel branches 63A, 63B and 63C and branches 64A, 64B and 64C connected with connector pins 24–6 and 24–11 of the connectors associated with control units $C_A$, $C_B$ and $C_C$, respectively. Further, a diode $D_5$ is interposed in each of branches 64A, 64B and 64C.

With the arrangement and connections for bell assembly 57 as described and shown, the energizing of relay 29 in any one of the tape playback units engages relay contact 29–4 with its fixed contact b so that charges are placed on capacitors $C_4$ and $C_5$ through junction 47 therebetween. When relay 29 is deenergized or opens to stop operation of the related tape playback unit, the charges on capacitors $C_4$ and $C_5$ are discharged through junction 47, relay contact 29–4, conductor 46, connector pin 24–11, conductor branch 64A, 64B or 64C, contacts 61, solenoid 60, conductor branch 63A, 63B or 63C and connector pin 24–6 to ground, whereby to cause a single striking of bell 58 by striker 59.

In employing the above-described apparatus for administering standard tests, a cartridge having its tape recorded to correspond to a particular test is installed on one of the tape playback units $TP_A$, $TP_B$ or $TP_C$ and locked in position by actuation of the play-release lever so as to close switch 27 of the deck assembly. The pertinent test materials, for example, test booklets and writing instruments are distributed to the examinees who are seated either at certain of the test stations $TS_1$, $TS_2$, $TS_3$—$TS_n$ or in one of the testing rooms $R_1$, $R_2$ or $R_3$. If the examinees are in one of the testing rooms, for example in the room $R_1$, the loudspeaker $Sp_1$ for that room has its plug inserted in the jack $J_A$, $J_B$ or $J_C$ of the control unit for the tape playback unit, for example, the unit $TP_A$, on which the cartridge has been installed. If the examinees are located at certain test stations, for example, the test stations $TS_1$ and $TS_3$, the selector switches $S_1$ and $S_3$ for such stations are manipulated to engage their wipers 56 with the respective fixed contacts A.

When the on-off switch 48 of the control unit $C_A$ is closed or moved to its "on" position, "ready" light 53 is illuminated to indicate to the examiner at the control console that power is being supplied to the associated playback unit $TP_A$ and that the latter is in condition to operate, that is, its play-release lever is positioned to lock the cartridge in place and close switch 27. After illumination of "ready" light 53, the examiner presses the "start" switch 52 of control unit $C_A$ which initiates energization of relay 29, and the latter is thereafter held in its energized or closed position by engagement of its contact 29–2 with the related fixed contact b. Closing of relay 29 energizes solenoid 28 of the deck assembly to move the capstan pressure roller against the capstan driven by energized motor M, whereby the tape is driven in the cartridge installed on tape playback unit $TP_A$.

During movement of the tape, head 11 picks up the signals in track $t_1$ which are amplified in audio amplifier 14 and audibly reproduced either at the loudspeaker $Sp_1$ or at the head phones or earphones at the testing stations $TS_1$ and $TS_3$ connected to control unit $C_A$ in the example being described. Thus, the examinees receive the recorded instructions or directions for taking the test and then the verbal start signal to commence the test itself. At the conclusion of the time allotted for the test, the examinees receive the verbal stop signal. Of course, if desired, the track $t_1$ of the tape, between lengths $L_2$ and $L_3$ in which the verbal start and stop signals are recorded, may contain the actual content of the test where the latter is to be verbally administered.

When tape playback unit $TP_A$ is operating, as above, in response to energizing of relay 29, the "ready" light 53 of control unit $C_A$ is extinguished and "running" light 54 is illuminated to indicate to the examiner that the related tape playback unit is in operation. Shortly before the end of the time allotted for the test, head 12 reproduces the 400 c./s. "alert" tone signal in length $L_5$ of track $t_2$ and such signal is audibly reproduced by speaker 21 of tape playback unit $TP_A$ to advise the examiner that the test is about to end.

At the end of the time allotted for the test, head 12 reproduces the 1000 c./s. cue signal in length $L_4$ of track $t_2$ and, as described above, such cue signal fires SCR 23 to open or release relay 29. Release of relay 29 causes deenergizing of solenoid 28 so that tape movement is halted and striking of bell 57 to advise the examiner that the test is completed and that the test papers should be collected. Further, release of relay 29 extinguishes "running" light 54 and illuminates "ready" light 53 until on-off switch 48 is moved to its "off" position.

If two or more tests are to be administered in sequence to the same examinees, the instructions and timing signals for such tests can be recorded successively on a single tape. In that case, at the conclusion of one test, the next test is initiated merely by again pressing the start switch 52. At the conclusion of the sequence of tests, or at the conclusion of a single test recorded on the looped tape, the tape is returned to its initial position.

It will be apparent that, if different tests are to be simultaneously administered to a number of examinees, the corresponding tapes may be played-back on different tape playback units which are connected with respective testing stations or test rooms. Since the times allotted for the respective tests are automatically controlled by the tapes, there is no possibility that the examiner may afford the incorrect amount of time for completion of the simultaneously administered tests. Further, since the instructions or directions for the tests are recorded on the tapes, it is certain that all examinees will receive the instructions in a uniform and understandable fashion.

Since the examiner is not burdened with timing the tests or with orally presenting the instructions therefor, the examiner has time available during the conducting of the tests to perform other functions, such as, scoring of previously given tests, interviewing of applicants and the handling of employment applications and references and the like.

The selection of 1000 c./s. for the cue signal to halt operation of the playback unit ensures that the test administering apparatus will not be used for unauthorized playing of recorded music tapes. The selected 1000 c./s. frequency is prevalent enough in all music so that, if a tape cartridge of recorded music is played on one of the units $TP_A$, $TP_B$ or $TP_C$, the SCR 23 will be fired soon after the commencement of operation to halt the same. The foregoing would occur even with a two-track tape recorded with music, as one of the tracks containing music would be scanned by head 12.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention.

We claim:

1. In a test administering apparatus, the combination of a plurality of individually operable tape playback units each adapted to reproduce signals magnetically recorded on a respective tape while moving the latter at a standardized speed, said signals recorded on each said tape representing at least verbal instructions for a respective test, verbal start and stop signals which are spaced apart along the tape by a distance corresponding, at said standard speed, to a predetermined time allotted for said respective test, a cue signal located along the tape to be reproduced upon the reproduction of said verbal stop signal and an alert tone signal located to be reproduced in advance of said cue signal, each of said playback units including head means to reproduce said recorded signals from the respective tape, a control station adjacent said playback units and a plurality of testing stations, station selecting means at said control station operable to selectively direct the reproduced verbal instructions and verbal start and stop signals from any of said playback units to any of said testing stations, transducer means at each of said testing stations to convert to audible form the reproduced verbal instructions and verbal start and stop signals, means at said control station to initiate the operation of each of said playback units, means to provide an alert tone audible by an examiner at said control station in response to the reproduction of said alert tone signal by any of said playback units, means responsive to the reproduction of said cue signal by each of said playback units to halt the operation of the respective playback unit, and means at said control station to signal to an examiner thereat that the operation of a playback unit has been halted.

2. A test administering apparatus according to claim 1, in which said head means of each playback unit includes first and second heads scanning first and second tracks of the respective tape, said verbal instruction and start and stop signals are recorded in said first track, and said alert tone signal and cue signal are recorded in said second track.

3. A test administering apparatus according to claim 2, in which said alert tone signal and cue signal are uniform frequency signals of respectively different frequencies, and in which filter means are provided to separate said alert tone and cue signals in the output from said second head.

4. A test administering apparatus according to claim 3, in which said means to initiate the operation of each playback unit includes an element causing said operation upon the imposition of a voltage thereto of at least a predetermined value, and said means to halt the operation of the respective playback unit is effective to pull down the voltage on said element below said predetermined value in response to the occurrence of a pulse of said cue signal frequency for at least a predetermined period.

5. A test administering apparatus according to claim 4, in which said means to halt the operation of the respective playback unit is a semiconductor controlled rectifier having its gate connected to receive said pulse of cue signal frequency and, when thus fired, being effective to pull down said voltage by reason of the conductive path established from the anode to the cathode of said rectifier.

6. A test administering apparatus according to claim 5, in which a capacitor is connected with said cathode to permit the voltage to be pulled down below said value only when said capacitor is discharged at the time of firing of said controlled rectifier, and in which means are provided to temporarily charge said capacitor at the time of initiation of operation of said respective playback unit.

7. A test administering apparatus according to claim 6, in which said tape is in the form of an endless loop and is returned substantially to its initial position upon the halt of the operation of the respective playback unit, and said means provided to temporarily charge said capacitor ensure that the initiation of operation of the playback unit will not be disturbed by the simultaneous reproduction of the terminal portion of said cue signal.

8. A test administering apparatus according to claim 1, in which said transducer means at said testing stations are for utilization by individual examinees, and there are further provided a plurality of loudspeakers selectively connectable to said playback units by way of said control station to reproduce said verbal instructions and start and stop signals in audible form for groups of examinees.

9. A magnetic tape loop for use in administering a test, said tape having first and second record tracks, said first track having recorded therein along successive lengths signals corresponding to verbal instructions for performance of the respective test, and signals corresponding to verbal start and stop orders, respectively, said lengths of the first track along which said verbal start and stop order signals are recorded being spaced apart by a distance corresponding to the time allotted for the respective test at a predetermined playback speed of the tape, said second track having recorded therein a constant frequency cue signal along a length of the tape which immediately follows said length in which the signals corresponding to said verbal stop order are recorded, and said second track further having recorded therein an alert tone signal of a constant frequency different from that of said cue signal and which is located along a length of the tape in advance of said length containing the cue signal.

10. A magnetic tape loop according to claim 9, in which said constant frequency of the cue signal is about 1000 c./s., and said constant frequency of the alert tone signal is about 400 c./s.